Nov. 19, 1968    G. ZOEHFELD    3,411,707
APPARATUS FOR PREVENTING GAS FLOW THROUGH BEARINGS
Filed March 23, 1967
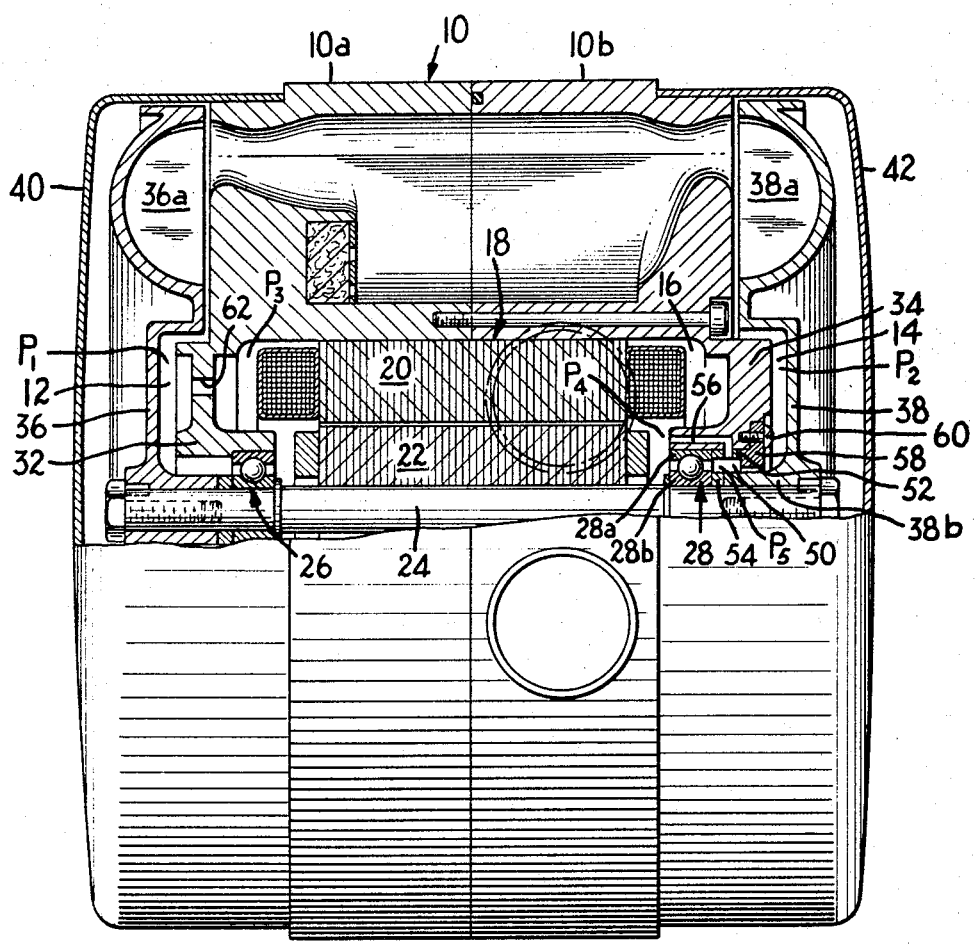
INVENTOR.
GUNTHER ZOEHFELD
BY Brumbaugh, Free, Graves & Donohue
his ATTORNEYS United States Patent Office 3,411,707
Patented Nov. 19, 1968

3,411,707
APPARATUS FOR PREVENTING GAS FLOW
THROUGH BEARINGS
Gunther Zoehfeld, West Hurley, N.Y., assignor to Rotron
Manufacturing Company, Inc., Woodstock, N.Y., a
corporation of New York
Filed Mar. 23, 1967, Ser. No. 625,423
7 Claims. (Cl. 230—130)

ABSTRACT OF THE DISCLOSURE

An arrangement for preventing gas flow through bearings subject to differential pressures to prevent lubricant blowout comprising a presure balance zone in free gas communication with one side of the bearing and freely communicated to the other side of the bearing. The pressure balance zone is otherwise substantially closed. Thus, the pressure balance zone and the said one side of the bearing are maintained at substantially the same pressure as the zone on the other side of the bearing, and gas flow through the bearing is substantially eliminated.

Background of the invention

This invention relates to the retention of lubricant in bearings and, more particularly, to a highly effective and yet inexpensive arrangement for preventing lubricant from being blown out of bearings by differential pressures across them.

In a wide variety of rotary machines, one or more bearings may be subjected to differential gas pressures which can cause a flow of gas through them. Over a period of time, even a small gas flow can gradually blow out the lubricant to an extent that the bearing ultimately fails. Accordingly, many machines are designed with elaborate bearing seals to retain lubricant in the bearing and provide lifetime lubrication for it. The effectiveness of these seals varies, but in any case they are often costly to produce, and their inclusion in a machine can significantly increase its production cost.

Summary of the invention

There is provided, in accordance with the invention, a novel and improved arrangement for substantially eliminating pressure differentials across a bearing to prevent lubricant from being blown out of the bearing where zones of the machine on either side of it are at different pressures. The invention includes providing a pressure balance zone adjacent one side of and in free fluid communication with the bearing and also in free communication with the area or zone of the machine located on the opposite side of the bearing. The pressure balance zone is substantially sealed off from the remaining machine zone so that pressure communication is reduced to a minimum. With this construction, the pressures on opposite sides of the bearing are substantially equal and any differential pressure involved in the operation of the machine occurs between the balance zone and the second above-mentioned machine zone. Any loss to or gain from the pressure balance zone cannot result in any significant flow of gas through the bearing, inasmuch as any gas is bypassed through the free communication path between the pressure balance zone and the first machine zone (the zone on the opposite side of the bearing from the balance zone). The arrangement of the invention makes it unnecessary to provide any elaborate form of seal, inasmuch as a degree of leakage between the pressure balance zone and the second machine zone from which the balance zone is sealed off can occur without substantially affecting the pressure balance across the bearing. Thus, the invention provides an effective and yet low cost way of preserving life-time lubrication in a machine bearing.

Description of exemplary embodiment

For a better understanding of the invention, reference may be made to the following description of an exemplary embodiment, taken in conjunction with the drawing which is a side view, partly in section taken along the machine axis and partly in elevation, of a compressor which is equipped with a bearing pressure equalizing arrangement constructed according to the invention.

The embodiment shown in the drawing is a compressor which has two compressor stages adapted to be connected for parallel, series, or independent operation. The basic construction of the illustrated compressor is shown in copending U.S. patent application Ser. No. 552,867, entitled "Staged Compressors," filed May 25, 1966, now Patent 3,375,970 by the present inventor and assigned to the assignee of this application. Briefly the compressor includes a housing 10 constituted by a pair of similar housing members 10a and 10b which are formed with toroidal or annular compressor chambers (not visible in the drawing) at either outboard end of the housing. Disposed in an interior chamber or cavity 16 within the housing 10 is a motor 18, which is shown schematically to include a stator 20 and a rotor 22. The rotor 22 is attached to a shaft 24 which is journaled for rotation in spaced-apart bearings 26 and 28 supported by flanges 32 and 34 extending inwardly from the main bodies or shells of the housing members 10a and 10b, respectively.

At the ends of the shaft 24 are impellers 36 and 38 having a plurality of spaced-apart radial blades 36a and 38a disposed in channels of generally semicircular cross-section formed in the outer peripheral parts of the respective impellers 36 and 38. Each of the impellers coacts with the corresponding compressor chamber. Protective covers 40 and 42 at the ends of the housing enclose the impellers and preclude damage to and misalignment of the impellers as well as seal the housing against air leakage.

As may be better understood by reference to the application referred to above, the housing members 10a and 10b are formed with an arrangement of passageways and baffles, the specific construction of which can be varied with a minimum of difficulty and expense to provide various forms of operation for the two compressor stages. In one form, the passages and baffles can be arranged to provide independent operation of the two stages; in another, the stages can be operated in parallel; and in yet a third, the two stages can be placed in series.

In any case, and especially in the third instance where the compressor stages are in series, the respective compressor chambers may be at substantially different gas pressures. The compressor chambers are, moreover, in communication with clearance spaces 12 and 14 defined between the impellers 36 and 38 and the housing flanges 32 and 34, respectively, and these spaces will of course also be at different pressures wherever the compressor chambers are. For example, the clearance space 12 may be at a pressure $P_1$ which is substantially greater than a pressure $P_2$ in the clearance space 14. In this event, the air or other gas being compressed in the machine may leak from the space 12 to the space 14 by passing through the bearing 26, the air gap between the motor stator 20 and rotor 22, and the bearing 28 into the lower pressure space 14. Such a flow of gas through the bearings 26 and 28 would over a period of time blow out the lubricant and would render the bearings highly susceptible to overheating and burning out.

In accordance with the invention, an arrangement is provided for substantially preventing any leakage tending to take place between the compressor stages via the leakage path described above from creating a gas flow through the bearings 26 and 28 and for thereby preventing lubricant from being blown out of the bearings. More particularly, a pressure balance zone 50 is provided adjacent the bearing 28 and on the opposite end of the bearing from the motor cavity 16. The zone 50 is defined (1) by a spacer ring 52 mounted on the inwardly facing surface of the flange 34 and abutting the end of the outer bearing race 28a of the bearing 28, (2) by the outer surfaces of a central hub 38b by which the impeller 38 is mounted on the shaft 24 and a spacer ring 54 mounted between the hub 38b and the inner bearing race 28b, and (3) by a sealing ring 58 attached by screws 60 to the housing flange 34. The inner edge of the sealing ring 58 is at a minimum clearance from the outer surface of the impeller hub 38b so that gas flow between the pressure balance space 50 and the clearance space 14 is kept at a minimum so as to maintain optimum efficiency of operation of the compressor.

A multiplicity of circumferentially spaced-apart passages 56 are formed in the housing flange 34 and the spacer 52 to communicate freely the motor cavity 16 of the housing with the pressure balance zone 50. The passages 56, in effect, constitute a pressure bypass around the bearing and afford the relatively free communication of pressure between the cavity 16 and the pressure balance zone 50.

The flange 32 of the left housing member 10a is formed with a plurality of circumferentially spaced-apart pressure balance holes 62 which afford free communication of pressure between the left clearance space 12 and the motor cavity 16.

The bearing pressure equalization arrangement operates in the following manner. Assuming as before that the pressure $P_1$ in the left clearance space 12 is substantially greater than the pressure $P_2$ in the right clearance space 14, the pressure $P_3$ in the left part of the cavity 16 will be substantially equal to the pressure $P_1$ in the space 12, inasmuch as the pressure balance holes 62 provide substantially free communication between the left part of the cavity 16 and the space 12. The pressure $P_4$ in the right part of the motor cavity 16 will be substantially equal to the pressure $P_3$, inasmuch as the air gap constitutes a passage between the left and right portions of the cavity. The pressure $P_4$ will be relatively freely communicated through the passageways 56 to the pressure balance zone 50 so that the pressure $P_5$ in the pressure balance zone will be substantially equal to the pressure $P_4$. The flow from the pressure balance zone 50 to the clearance space 14 resulting from the pressure differential between $P_2$ and $P_5$ is kept at a minimum, and in particular is only a small fraction of the possible gas flow rate through the passageways 56 inasmuch as the clearance between the sealing ring 58 and the impeller rotor shaft assembly is minimal. Accordingly, any gas leakage from the pressure balance zone 50 to the clearance space 14 will not significantly affect the pressure $P_5$ in the pressure balance zone.

The net result of the arrangement, and its operation as described above, is that the pressure $P_5$ in the pressure balance zone is not substantially less than the pressure $P_1$ in the clearance space 12. Accordingly, the flow of air (or other gas being compressed by the compressor) from the higher pressure compressor to the lower pressure stage is minimized. Moreover, the pressures on opposite sides of the respective bearings 26 and 28 are substantially equal so that air flow through the respective bearings is substantially prevented. Accordingly, there is no tendency for lubricant to be blown out of the bearings.

It is clear that the arrangement will be equally effective where the pressure $P_1$ in the left compressor stage is below the pressure $P_2$ in the right compressor stage.

It will be noted that the arrangement of the invention can be provided with a minimum of change in the structure of the compressor. The arrangement can be provided by merely drilling the pressure balance holes 62, the passages 56 and installing and sealing ring 58 on what is otherwise a substantially unchanged device. Many other existing machines in which the problem of lubricant blow-out occurs can similarly be modified at low cost to provide an effective solution to the problem.

It will be understood that the above-described embodiment is merely exemplary and that many variations and modifications of it can be made by those skilled in the art without departing from the spirit and scope of the invention. All such variations and modifications are intended to be included within the scope of the invention as defined in the appended claims.

I claim:

1. In a machine having a fixed member, a bearing carried by the fixed member, a rotary member carried by the bearing and means defining a first zone on one side of the bearing and a second zone on the other side of the bearing, the said zones being at different gas pressures when the machine is in operation, the combination therewith of means for restricting the passage of gas through the bearing to prevent lubricant from being blown out of the bearing comprising means defining a presure balance zone adjacent the said one side of the bearing and in substantially free gas pressure communication with the said one side, means communicating the pressure balance zone with the said second zone to maintain the pressure balance zone at substantially the same pressure as the second zone, and seal means between the pressure balance zone and the said first zone to restrict gas pressure communication between the pressure balance zone and the first zone.

2. A machine according to claim 1 wherein the sealing means is constituted by a close clearance between the fixed and rotary members on the said one side of the bearing.

3. In a compressor having a housing member defining an interior cavity, a bearing carried by the housing, a shaft rotatably carried by the bearing, and a compressor stage including an impeller fixed to the shaft, the housing member including a portion carrying the bearing and constituting a barrier between the compressor stage and the interior cavity, the combination therewith of means for restricting the passage of gas between the compressor stage and the cavity through the bearing to prevent lubricant from being blown out of the bearing comprising means defining a pressure balance zone adjacent the bearing and in substantially free gas pressure communication with both ends of the bearing, means communicating the pressure balance zone with the internal cavity and with the compressor stage, and seal means in one of the said communicating means to restrict communication of pressure therethrough so as to limit pressure leakage between the compressor stage and internal cavity.

4. A compressor according to claim 3 wherein the seal means is in the means communicating the compressor stage and the pressure balance zone, whereby the pressure in the pressure balance zone and the internal cavity are substantially equal.

5. A compressor according to claim 3 wherein the barrier part includes a portion spaced from and defining with the rotary member the pressure balance zone, said pressure balance zone being annular and generally coincident with the bearing, a passage formetd in the barrier communicating the internal cavity with the pressure balance zone and wherein the seal means is constituted by a close clearance between the barrier and the rotary shaft.

6. In a compressor having a housing, a pair of spaced-apart compressor stages adapted to operate at different pressures, spaced bearings carried by the housing and located between the compressor stages and means defining an internal cavity in the housing subject to gas communication with the compressor stages through the bearings, the combination therewith of means for restricting the passage of gas through the bearings to prevent lubricants from being blown out by fluid flow therethrough between the respective compressor stages through the internal cavity compresing pressure equalization means between one compressor stage and the internal cavity, means defining a pressure balance zone adjacent the second bearing and in substantially free gas pressure communication therewith, means communicating the internal cavity with the pressure balance zone to maintain the pressure balance zone at substanteially the same pressure as the internal cavity and seal means between the pressure balance zone and the second compressor stage for restricting gas pressure communication between the pressure balance zone and the second compressor stage.

7. A compressor according to claim 6 wherein the housing includes spaced bearing seats at the inward ends of flanges defining the barrier walls between the internal cavity and the respective first and second compressor stages, the bearings carrying a rotary member, at least one opening in the flange between the first compressor stage and the internal cavity constituting the pressure equalization means, a passage in the flange between the internal cavity and the second compressor stage constituting the means for equalizing the pressures in the pressure balance zone and the internal cavity and wherein the seal means is constituted by a close clearance between the second flange and the rotary member for limiting the flow of gas from the pressure balance zone to the second compressor stage.

References Cited
UNITED STATES PATENTS

| | | | |
|---|---|---|---|
| 2,973,135 | 2/1961 | Greenwald | 103—112 |
| 3,128,713 | 4/1964 | Nechine | 103—112 |
| 3,355,095 | 11/1967 | Hollenberg | 230—125 |
| 3,365,122 | 1/1968 | Hajec et al. | 230—117 |

HENRY F. RADUAZO, *Primary Examiner.*